(12) United States Patent
Ohashi et al.

(10) Patent No.: US 12,303,873 B2
(45) Date of Patent: May 20, 2025

(54) EXHAUST GAS PURIFICATION CATALYST

(71) Applicant: Cataler Corporation, Kakegawa (JP)

(72) Inventors: Tatsuya Ohashi, Kakegawa (JP); Kohei Takasaki, Kakegawa (JP); Yu Onohara, Kakegawa (JP); Keiichi Narita, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 247 days.

(21) Appl. No.: 18/019,162

(22) PCT Filed: Jul. 19, 2021

(86) PCT No.: PCT/JP2021/027036
§ 371 (c)(1),
(2) Date: Feb. 1, 2023

(87) PCT Pub. No.: WO2022/030241
PCT Pub. Date: Feb. 10, 2022

(65) Prior Publication Data
US 2023/0302434 A1  Sep. 28, 2023

(30) Foreign Application Priority Data
Aug. 7, 2020 (JP) .................................. 2020-134758

(51) Int. Cl.
*B01J 21/06* (2006.01)
*B01D 53/32* (2006.01)
(Continued)

(52) U.S. Cl.
CPC .............. *B01J 23/58* (2013.01); *B01D 53/32* (2013.01); *B01J 21/06* (2013.01); *B01J 35/23* (2024.01);
(Continued)

(58) Field of Classification Search
CPC ... B01J 21/06; B01J 23/40; B01J 23/42; B01J 23/44; B01J 23/58; B01J 35/23; B01J 27/22; B01D 53/32
See application file for complete search history.

(56) References Cited

U.S. PATENT DOCUMENTS 5,597,771 A * 1/1997 Hu ............................ F01N 3/10
502/333
6,133,184 A 10/2000 Kiyooka et al.
(Continued)

FOREIGN PATENT DOCUMENTS

CN 1213584 A 4/1999
CN 104066507 A 9/2014
(Continued)

OTHER PUBLICATIONS

International Search Report, PCT Application No. PCT/JP2021/027036, mailed Aug. 31, 2021 (3 pages).
(Continued)

*Primary Examiner* — Cam N. Nguyen
(74) *Attorney, Agent, or Firm* — Occhiuti & Rohlicek LLP

(57) ABSTRACT

Provided is an exhaust gas purification catalyst that includes a base material containing a silicon-silicon carbide composite material and a catalyst layer containing a barium component and that has excellent high-temperature durability of oxygen storage capacity. The exhaust gas purification catalyst disclosed here includes a base material and a catalyst layer in contact with the base material. The base material contains a silicon-silicon carbide composite material. The catalyst layer contains a platinum-group catalyst, a barium component, and an oxygen storage material. The barium component is one material selected from the group consisting of barium and a barium compound. The barium component is present on at least a surface of the oxygen storage (Continued)

material. The barium component has an average particle size of 100 nm or more and 350 nm or less.

7 Claims, 3 Drawing Sheets

(51) Int. Cl.
    *B01J 23/40* (2006.01)
    *B01J 23/42* (2006.01)
    *B01J 23/44* (2006.01)
    *B01J 23/58* (2006.01)
    *B01J 27/22* (2006.01)
    *B01J 35/23* (2024.01)

(52) U.S. Cl.
    CPC .......... *B01D 2255/1023* (2013.01); *B01D 2255/2042* (2013.01); *B01D 2257/702* (2013.01); *B01D 2258/01* (2013.01)

(56) References Cited

U.S. PATENT DOCUMENTS

| | | | | |
|---|---|---|---|---|
| 6,180,075 | B1* | 1/2001 | Lindner | B01J 23/8946 423/213.2 |
| 6,348,430 | B1* | 2/2002 | Lindner | B01D 53/945 502/514 |
| 6,413,904 | B1* | 7/2002 | Strehlau | B01J 27/053 502/328 |
| 6,875,725 | B2* | 4/2005 | Lindner | B01J 35/45 502/328 |
| 7,276,212 | B2* | 10/2007 | Hu | B01J 37/0244 422/177 |
| 7,811,962 | B2* | 10/2010 | Hu | B01J 37/0244 502/304 |
| 8,617,496 | B2* | 12/2013 | Wei | B01J 35/19 502/514 |
| 8,950,174 | B2* | 2/2015 | Hilgendorff | B01J 23/63 60/299 |
| 9,057,310 | B2* | 6/2015 | Bergeal | B01J 35/19 |
| 9,192,917 | B2* | 11/2015 | Nakahara | B01J 37/0036 |
| 9,242,242 | B2* | 1/2016 | Hilgendorff | B01J 23/63 |
| 9,527,035 | B2* | 12/2016 | Bergeal | B01D 53/62 |
| 10,183,276 | B2* | 1/2019 | Karpov | B01J 37/0213 |
| 10,464,052 | B2* | 11/2019 | Hilgendorff | B01J 29/7415 |
| 11,504,700 | B2* | 11/2022 | Oishi | B01J 37/086 |
| 11,904,299 | B2* | 2/2024 | Zheng | B01D 53/9468 |
| 2012/0071318 | A1 | 3/2012 | Matsueda et al. | |
| 2012/0088655 | A1 | 4/2012 | Yabuzaki et al. | |
| 2014/0329669 | A1 | 11/2014 | Fujimura et al. | |
| 2015/0038325 | A1 | 2/2015 | Ando et al. | |
| 2016/0032806 | A1 | 2/2016 | Sugiyama et al. | |
| 2018/0071679 | A1* | 3/2018 | Karpov | F01N 3/20 |
| 2019/0111389 | A1* | 4/2019 | Camm | B01D 53/945 |
| 2022/0055021 | A1* | 2/2022 | Liu | B01J 23/56 |

FOREIGN PATENT DOCUMENTS

| | | |
|---|---|---|
| CN | 104168999 A | 11/2014 |
| CN | 111468114 A | 7/2020 |
| JP | H1043598 A | 2/1998 |
| JP | H11230132 A | 8/1999 |
| JP | 2004351292 A | 12/2004 |
| JP | 2010229976 A | 10/2010 |
| JP | 2011194323 A | 10/2011 |
| JP | 6052250 B2 | 12/2016 |
| JP | 6364374 B2 | 7/2018 |
| WO | 2010137658 A1 | 12/2010 |
| WO | 2010147163 A1 | 12/2010 |
| WO | 2014156746 A1 | 10/2014 |

OTHER PUBLICATIONS

Chinese Office Action in CN 202180056716.1, issued Jul. 22, 2024 (4 pages).

Office Action issued in Chinese Application No. 202180056716.1 dated Mar. 14, 2024.

* cited by examiner

EXHAUST GAS PURIFICATION CATALYST

This application is a 371 national stage application of International Application No. PCT/JP2021/027036, filed Jul. 19, 2021, which claims the benefit of the filing date of Japan Application No. JP 2020-134758, filed Aug. 7, 2020, the contents of which are hereby incorporated by reference in their entirety.

TECHNICAL FIELD

The present invention relates to an exhaust gas purification catalyst, and particularly to an exhaust gas purification catalyst preferably applicable as an electrically heated catalyst. This application claims the benefit of priority to Japanese Patent Application No. 2020-134758 filed on Aug. 7, 2020. The entire contents of this application are hereby incorporated herein by reference.

BACKGROUND ART

An electrically heated catalyst (EHC) has attracted attention as a catalyst for purifying an exhaust gas emitted from an engine of, for example, an automobile. To enable an exhaust gas purification catalyst for an internal combustion engine to exhibit sufficient purification performance, the temperature of the exhaust gas purification catalyst needs to increase to a temperature at which the catalyst is activated. A typical exhaust gas purification catalyst is heated by using heat of an exhaust gas, and thus, if the temperature of the exhaust gas is low, for example, immediately after the engine has started, high purification performance cannot be obtained. On the other hand, in an electrically heated catalyst, even if the temperature of an exhaust gas is low, for example, immediately after the engine has started, the catalyst can be activated by increasing the temperature of the catalyst in a short time by energization heating. Thus, even if the temperature of the exhaust gas is low, sufficient purification performance can be obtained, and purification efficiency of the exhaust gas can be enhanced accordingly.

A typical configuration of an electrically heated catalyst includes a base material and a catalyst layer. A known base material of an electrically heated catalyst contains silicon carbide (SiC), which is ceramic having conductivity. A known example of this base material includes a silicon-silicon carbide (Si—SiC) composite material in which Si is bonded to SiC as a material having a lower resistance than SiC (see, for example, Patent Documents 1 and 2). On the other hand, a known catalyst layer of an electrically heated catalyst contains, for example, a platinum-group metal (PGM) as a catalyst component, and an oxygen storage material (OSC material) (see, for example, Patent Document 3).

CITATION LIST

Patent Documents

Patent Document 1: Japanese Patent No. 6052250
Patent Document 2: Japanese Unexamined Patent Application Publication No. 2011-194323
Patent Document 3: Japanese Unexamined Patent Application Publication No. 2004-351292

SUMMARY OF THE INVENTION

Technical Problems

Through an intensive study, inventors of the present invention have found the followings. In an exhaust gas purification catalyst using a base material including a Si—SiC composite material, when the catalyst is exposed to a high temperature, Si in the Si—SiC composite material migrates to a catalyst layer and is diffused therein to react with an oxygen storage material, resulting in the possibility of deterioration of the oxygen storage material. Here, in a case where the catalyst layer contains a barium (Ba) component in order to suppress poisoning of a platinum-group metal by hydrocarbon (HC), the Ba element promotes diffusion of Si into the catalyst layer, and consequently, promotes deterioration of the oxygen storage material. Thus, the case where the barium component is contained in the catalyst layer of the exhaust gas purification catalyst using the base material including the Si—SiC composite material involves the problem of low deterioration resistance of oxygen storage capacity when exposed to high temperatures (i.e., durability of oxygen storage capacity to high temperatures).

It is therefore an object of the present invention to provide an exhaust gas purification catalyst that includes a base material containing a Si—SiC composite material and a catalyst layer containing a barium component and that has excellent high-temperature durability of oxygen storage capacity.

Solution to Problems

An exhaust gas purification catalyst disclosed here includes: a base material; and a catalyst layer in contact with the base material. The base material contains a silicon-silicon carbide composite material. The catalyst layer includes a platinum-group catalyst, a barium component, and an oxygen storage material. The barium component is at least one material selected from the group consisting of barium and a barium compound. The barium component is present at least on the surface of an oxygen storage material. The barium component has an average particle size of 100 nm or more and 350 nm or less.

With this configuration, by controlling the particle size of the barium component appropriately, the Ba element can exist in a dispersed state in the catalyst layer together with the platinum-group catalyst, with reduction of contact between the Ba element contained in the catalyst layer and the Si element contained in the base material. Thus, diffusion of Si into the catalyst layer can be suppressed by the Ba element so that deterioration of oxygen storage material caused by Si can be thereby suppressed. As a result, high-temperature durability of oxygen storage capacity of the exhaust gas purification catalyst can be enhanced. That is, this configuration provides an exhaust gas purification catalyst that includes a base material containing a Si—SiC composite material and a catalyst layer containing a barium component and that has excellent high-temperature durability of oxygen storage capacity.

In a preferred aspect of the exhaust gas purification catalyst disclosed here, the average particle size of the barium component is 100 nm or more and 200 nm or less. This configuration can further enhance high-temperature durability of the oxygen storage capacity.

In another preferred aspect of the exhaust gas purification catalyst disclosed here, the platinum-group metal is Pd. This configuration can further enhance high-temperature durability of the oxygen storage capacity.

In yet another preferred aspect of the exhaust gas purification catalyst disclosed here, the exhaust gas purification catalyst further includes an electrode, and the exhaust gas purification catalyst is an electrically heated catalyst.

This configuration provides the electrically heated catalyst having excellent high-temperature durability of oxygen storage capacity.

DESCRIPTION OF PREFERRED EMBODIMENTS

Figure 1:
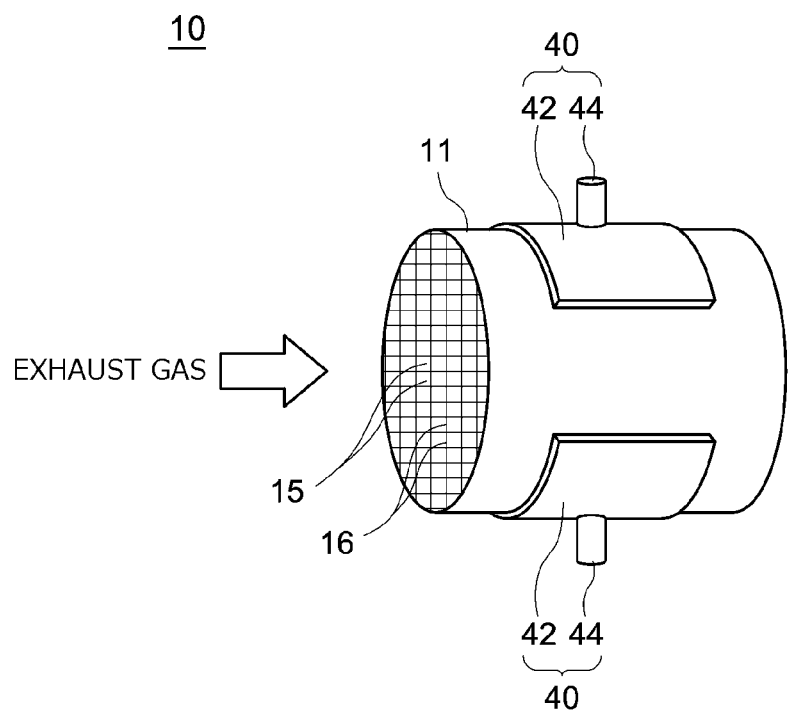
FIG. 1 A perspective view schematically illustrating an example of an exhaust gas purification catalyst according to one embodiment.

Preferred embodiments of the present invention will be described hereinafter with reference to the drawings. Matters not specifically mentioned in the description but required for carrying out the present invention can be understood as design matters of a person skilled in the art based on related art in the field. The present invention can be carried out on the basis of the contents disclosed in the description and technical knowledge in the field. The drawings described later are schematically shown for understanding the contents of the invention, and dimensional relationships (e.g., length, width, and thickness) in the drawings do not reflect actual dimensional relationships.

Figure 2:
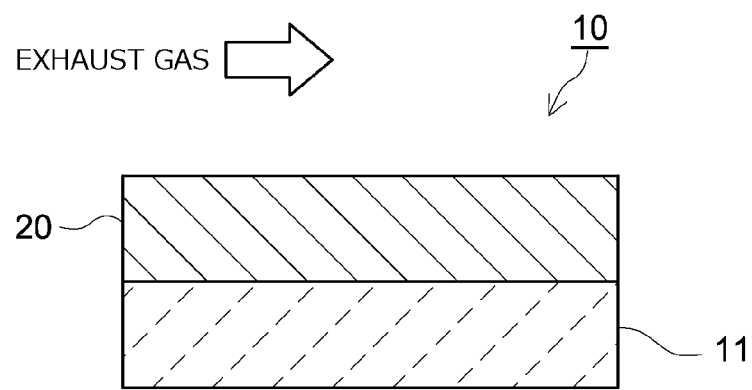
FIG. 2 A cross-sectional view schematically illustrating an example of a layered structure of the exhaust gas purification catalyst illustrated in FIG. 1.

FIG. 1 schematically illustrates an example of an exhaust gas purification catalyst according to this embodiment. FIG. 1 is an example of a case where the exhaust gas purification catalyst according to this embodiment is configured as an electrically heated catalyst. FIG. 2 schematically illustrates a layered structure of the exhaust gas purification catalyst illustrated in FIG. 1.

As illustrated in FIGS. 1 and 2, an exhaust gas purification catalyst 10 includes a base material 11 and a catalyst layer 20. The catalyst layer 20 is disposed directly on the base material 11, and therefore, the catalyst layer 20 is in contact with the base material 11.

<Base Material>

The base material 11 is a member supporting the catalyst layer 20. The base material 11 contains a Si—SiC composite material. Since the base material 11 contains the Si—SiC composite material, high conductivity can be obtained. In addition, the Si—SiC composite material can function as a resistance heating body, and thus, the Si—SiC composite material contained in the base material 11 enables the exhaust gas purification catalyst 10 to be used as an electrically heated catalyst.

The base material 11 may contain a component other than the Si—SiC composite material within the range that does not significantly inhibit advantages of the present invention. A ratio of Si to SiC (Si/SiC) in the Si—SiC composite material is not specifically limited, and may be the same as or similar to a ratio (Si/SiC) in a known Si—SiC composite material for use in a base material of an exhaust gas purification catalyst.

The base material 11 may have a S or similar to that of a known exhaust gas purification catalyst. For example, the base material 11 may be a straight-flow or wall-flow honeycomb base material that is generally used in an exhaust gas purification catalyst.

In the example illustrated in FIG. 1, the base material 11 has a cylindrical outer shape. The outer shape of the base material 11 is not limited to this example, and may be an oval cylindrical shape or a polygonal cylindrical shape, for example. Dimensions of the base material 11 are not specifically limited, and may be the same as or similar to those of a known exhaust gas purification catalyst used as an electrically heated catalyst.

Arrows in FIGS. 1 and 2 represent a flow direction of an exhaust gas. The base material 11 includes a plurality of cells 15 whose both ends at an exhaust gas inflow side and an exhaust gas outflow side are open, and partitions 16 partitioning adjacent ones of the cells 15. The shape of each cell 15 is not specifically limited, and may be a quadrangle such as a square, a parallelogram, a rectangle, or a trapezoid; another polygonal shape such as a triangle, a hexagon, or an octagon; or a circle, for example. In the exhaust gas purification catalyst 10 including the illustrated base material 11, an exhaust gas that has flowed into the cells 15 from the end at the exhaust gas inflow side passes through the cells 15 and flows out from the end at the exhaust gas outflow side.

A catalyst layer 20 is formed in at least a portion of the base material 11. Although not shown in FIG. 1, the catalyst layer 20 is formed in the cells 15.

<Catalyst Layer>

The catalyst layer 20 contains a platinum-group metal as a catalyst component. Specifically, the catalyst layer 20 contains at least one metal selected from the group consisting of platinum (Pt), rhodium (Rh), palladium (Pd), ruthenium (Ru), osmium (Os), and iridium (Ir). Here, Pd and Pt have high purification performance (performance in oxidation purification) of carbon monoxide (CO) and hydrocarbon (HC), and Rh has high purification performance (performance in reduction purification) of NOx. Thus, from the viewpoint of high purification performance, the platinum-group metal contained in the catalyst layer 20 is preferably at least one metal selected from the group consisting of Pt, Rh, and Pd. In a case where the platinum-group catalyst is Pd, Si, which causes degradation of oxygen storage capacity, is more easily diffused in the catalyst layer. Thus, because of more enhanced high-temperature durability of oxygen storage capacity, Pd is more preferable as the platinum-group metal.

From the viewpoint of increasing a contact surface area with an exhaust gas, the platinum-group metal is preferably fine particles. Specifically, the platinum-group metal has an average particle diameter of preferably 15 nm or less, more preferably 10 nm or less, further preferably 7 nm or less, and most preferably 5 nm or less. The average particle diameter of the platinum-group metal is preferably 1 nm or more. It should be noted that the average particle diameter of the platinum-group metal can be determined by acquiring an electron microscopic image (e.g., TEM image) of the platinum-group metal and calculating an average value of particle diameters of 20 or more particles selected randomly in the image.

The catalyst layer contains an oxygen storage material (so-called "OSC material"). The OSC material can function as a promoter of exhaust gas purification. As the OSC material, a compound known to have oxygen storage capacity may be used, and examples of the known compound include ceria ($CeO_2$) and a composite oxide including ceria. Examples of the composite oxide including ceria include composite oxide (ceria-zirconia composite oxide, i.e., a CZ composite oxide or ZC composite oxide) including ceria and zirconia ($ZrO_2$). In a case where the OSC material contains zirconium oxide, thermal degradation of cerium oxide can be suppressed. Thus, the OSC material is preferably ceria-zirconia composite oxide.

The OSC material may contain an oxide of a rare-earth element in order to enhance properties (especially heat resistance and oxygen storage/release property, for example). Examples of the rare-earth element include Sc, Y, La, Pr, Nd, Pm, Sm, Eu, Gd, Tb, Dy, Ho, Er, Tm, Yb, and Lu.

In a case where the OSC material is a composite oxide including cerium oxide, from the viewpoint of sufficiently exhibiting oxygen storage capacity thereof, the content of cerium oxide is preferably 15 mass % or more, and more preferably 20 mass % or more. On the other hand, if the content of cerium oxide is excessively high, basicity of the OSC material might be excessively high. For this reason, the content of cerium oxide is preferably 40 mass % or less, and more preferably 30 mass % or less.

The OSC material can also function as a carrier of a catalyst, and the like. Thus, in the catalyst layer 20, the platinum-group catalyst is typically supported by the OSC material. Alternatively, the catalyst layer 20 may further contain, as a carrier, an oxide (preferably alumina) other than the OSC material, such as alumina ($Al_2O_3$), titania ($TiO_2$), zirconia ($ZrO_2$), or silica ($SiO_2$). The platinum-group catalyst may be supported by this oxide carrier or may be supported by both the OSC material and this oxide carrier. To increase heat resistance, for example, the oxide carrier other than the OSC material may be supplemented with a small amount (e.g., 1 mass % or more and 10 mass % or less) of an oxide of a rare-earth element such as $Pr_2O_3$, $Nd_2O_3$, $La_2O_3$, or $Y_2O_3$.

The catalyst layer 20 contains a barium component. Since the catalyst layer 20 contains the barium component, poisoning of the platinum-group metal by hydrocarbon (HC) can be suppressed. In a case where the platinum-group metal is Pd, the barium component can suppress sintering of Pd.

The barium component is at least one selected from the group consisting of barium and a barium compound. Examples of the barium compound include barium sulfate, barium acetate, barium nitrate, and barium carbonate. Among these compounds, barium sulfate and barium acetate are preferable, and barium sulfate is more preferable.

In general, to highly disperse a barium component in a catalyst layer, the average particle size of the barium component is preferably as small as possible. Particularly, when the barium component has an average particle size of several nanometers (especially about 5 nm), the barium component has significantly high dispersibility.

However, in this embodiment, the barium component has an average particle size of 100 nm or more and 350 nm or less. By allowing the average particle size of the barium component to be significantly larger than about 5 nm, contact between a Ba element included in the catalyst layer 20 and Si included in the base material 11 can be reduced, and by allowing the average particle size of the Ba element to be in the range from 100 nm to 350 nm (both inclusive), the Ba element exists in a dispersed state in the catalyst layer 20 together with the platinum-group catalyst. Thus, by setting the average particle size of the barium component within this range, diffusion of Si into the catalyst layer 20 can be suppressed by the Ba element. Accordingly, deterioration of the OSC material by Si can be suppressed, resulting in enhancement of high-temperature durability of the OSC. From the viewpoint of more excellent high-temperature durability of the OSC, the average particle size of the barium component is preferably 100 nm or more and 200 nm or less, and more preferably 150 nm or more and 200 nm or less. When the average particle size of the barium component is 100 nm or more, Si—SiC base material 11 is less likely to be damaged, and high NOx purification performance can also be obtained.

It should be noted that the average particle size of the barium component can be, for example, determined as follows. First, a portion of the catalyst layer 20 is collected as a sample from the exhaust gas purification catalyst 10. Next, an electron microscopic image of this sample is acquired using an electron microscope (e.g., scanning electron microscope (SEM) or transmission electron microscope (TEM)). Then, 20 or more particles each of which is entirely seen are selected from particles of the barium component appearing in the electron microscopic image, and the area of each selected particle is obtained. Diameters of circles each having an area equal to the area of each selected particle are calculated, and an arithmetic mean of these diameters is obtained. This arithmetic mean is defined as an average particle size.

It should be noted that the average particle size of the barium component can be adjusted in a method for producing a catalyst layer using slurry containing a barium source, by controlling an average particle size of the barium source, for example.

The barium component is present at least on the surface of the OSC material. The barium component is typically supported by the OSC material. Alternatively, the catalyst layer 20 may further contain the above-described oxide carrier other than the OSC material, and the barium component may be supported by both the OSC material and this oxide carrier. In this case, 10 mass % or more, 30 mass % or more, or 50 mass % or more of the barium component is supported by the OSC material, for example.

A dispersion state of the barium component in the catalyst layer 20 is not specifically limited. Typically, since the catalyst layer 20 is formed using a slurry in which a platinum-group catalyst source, a barium source, an OSC material, and an optional oxide carrier are mixed, barium component is uniformly dispersed in the catalyst layer 20.

The content of the barium component in the catalyst layer 20 is not specifically limited. Preferably, a ratio of the mass of the barium component converted in terms of sulfate to the mass of the platinum-group element is 1/80 or more and 20 or less.

The catalyst layer 20 may further contain components (e.g., a binder and/or an additive) not described above. Examples of the binder include alumina sol and silica sol. Examples of the additive include a $NO_x$ adsorbent and a stabilizer.

The content of the platinum-group metal in the catalyst layer 20 is not specifically limited. For example, the content of the platinum-group metal in the catalyst layer 20 is 0.01 mass % or more and 8 mass % or less or 0.1 mass % or more and 5 mass % or less with respect to the total mass of the OSC material and the oxide carrier other than the OSC material, included in the catalyst layer 20.

Dimensions of the catalyst layer 20 are not specifically limited, and may be appropriately determined in accordance with, for example, the size of the cells 15 of the base material 11 and the flow rate of an exhaust gas supplied to the exhaust gas purification catalyst 10. The thickness of the catalyst layer 20 may be 1 μm or more and 500 μm or less or may be 5 μm or more and 200 μm or less.

The catalyst layer 20 may be formed only on a portion of the surface of the base material 11. For example, the catalyst layer 20 may be formed only on a front portion of the base material 11 (e.g., only on a region up to 30% from the end of the base material 11 at the exhaust gas inflow side in the flow direction of an exhaust gas) or only on a rear portion of the base material 11 (e.g., only on a region up to 30% from the end of the base material 11 at the exhaust gas outflow side in the flow direction of the exhaust gas). The catalyst layer 20 may have a uniform composition in the entire layer, or may have different compositions within the range of this embodiment. For example, in the catalyst layer 20, the front portion and the rear portion of the base material 11 may contain different platinum-group catalysts.

The exhaust gas purification catalyst 10 may include an element other than the base material 11 and the catalyst layer 20.

In the example illustrated in FIG. 1, the exhaust gas purification catalyst 10 is configured as an electrically heated catalyst. Thus, the exhaust gas purification catalyst 10 further includes an electrode 40 in addition to the base material 11 and the catalyst layer 20. The electrode 40 may be the same as or similar to an electrode included in a known electrically heated catalyst, and the electrode 40 may be a metal electrode or a carbon electrode, for example. In the illustrated example, the electrode 40 includes an electrode layer 42 disposed on the outer surface of the base material 11 and an electrode terminal 44. The electrode layer 42 has the function of diffusing a current. However, the configuration of the electrode 40 is not limited to this example as long as the base material 11 can be electrified.

Figure 3:
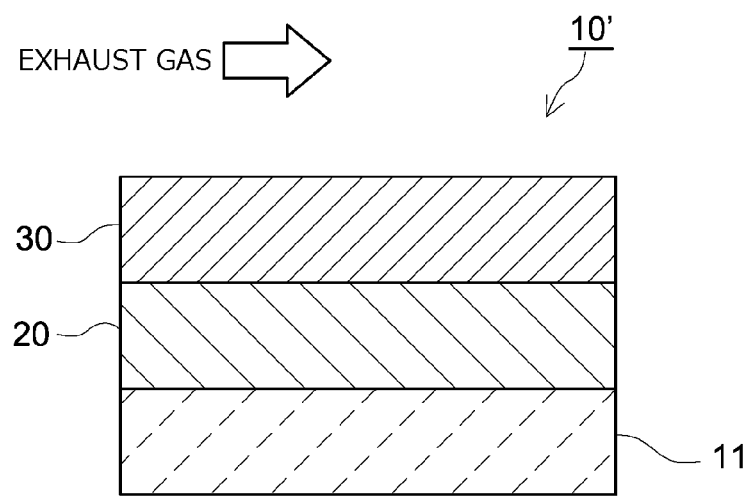
FIG. 3 A cross-sectional view schematically illustrating another example of the layered structure of the exhaust gas purification catalyst illustrated in FIG. 1.

FIG. 3 illustrates another example of the exhaust gas purification catalyst according to this embodiment. An exhaust gas purification catalyst 10' illustrated in FIG. 3 further includes a second catalyst layer 30 in addition to the first catalyst layer 20. The first catalyst layer 20 has a structure same as the structure described above. The second catalyst layer 30 includes a catalyst. The type of the catalyst included in the second catalyst layer 30 is not specifically limited. Here, when the second catalyst layer 30 contains, as a catalyst, a platinum-group element different from the platinum-group element contained in the first catalyst layer 20, exhaust gas purification performance of the exhaust gas purification catalyst 10 can be thereby enhanced. The second catalyst layer 30 may contain an oxide carrier, an OSC material for supporting a catalyst, and the like. The second catalyst layer 30 may contain Ba or may not contain Ba. In the case where the second catalyst layer 30 contains Ba particles, the average particle size of the Ba particles is not specifically limited, and may be less than 100 nm, may exceed 350 nm, or may be within the range from 100 nm or more and 350 nm or less.

As an example of the exhaust gas purification catalyst 10', the first catalyst layer 20 contains Pd, an oxide carrier (e.g., alumina) supporting Pd, Ba having an average particle size of 100 nm or more and 350 nm or less, and an OSC material (e.g., CZ composite material) supporting Ba. On the other hand, the second catalyst layer 30 contains Rh, an oxide carrier (e.g., alumina) supporting Rh, and an OSC material (e.g., CZ composite material).

The exhaust gas purification catalyst 10 can be, for example, produced as follows. First, a base material 11 containing a Si—SiC composite material is prepared. Constituents of a catalyst layer 20, for example, a platinum-group metal source such as a solution containing ions of a platinum-group metal, an OSC material, a Ba source (e.g., barium sulfate or barium acetate), and a dispersion medium are mixed, thereby preparing slurry for forming the catalyst layer 20. This slurry is applied into cells 15 of the base material 11, is dried, and when necessary, is fired. Thereby, the catalyst layer 20 is formed on the base material 11. Thereafter, the electrode 40 is attached in accordance with a conventional method.

The exhaust gas purification catalyst 10 can be used for exhaust gas purification of an internal combustion engine according to a known method. Specifically, for example, the exhaust gas purification catalyst 10 is disposed and used in an exhaust system (especially an exhaust pipe) of an automobile engine. Here, the exhaust gas purification catalyst 10 is configured as an EHC. In this case, the exhaust gas purification catalyst 10 is electrically connected to an automobile such that electricity is supplied from, for example, a battery of the automobile. The internal combustion engine is, for example, a gasoline engine or a diesel engine, and is preferably a gasoline engine.

Deterioration of oxygen storage capacity of the exhaust gas purification catalyst 10 when exposed to high temperatures (e.g., 900° C. or 1000° C.) for a long time is suppressed. Thus, the exhaust gas purification catalyst 10 has excellent high-temperature durability of oxygen storage capacity.

The example in which the exhaust gas purification catalyst according to this embodiment is configured as an electrically heated catalyst has been described above. Alternatively, the exhaust gas purification catalyst according to this embodiment may also be used as a fine particle collecting filter such as a gasoline particulate filter (GPF) or a diesel particulate filter (DPF). In reproducing a fine particle collecting filter, the catalyst is heated to burn fine particles. Thus, in the case of using the catalyst as the fine particle collecting filter, degradation of oxygen storage capacity in this heating can be suppressed.

The present invention will now be described in further detail below with reference to examples, but it is not intended to limit the invention to these examples.

<Production of Exhaust Gas Purification Catalyst>

Example 1

As a base material, a honeycomb base material of a Si—SiC composite material (volume: 551 mL, the number of cells: 600 cpsi, partition thickness: 5 mil, cell shape: quadrangle, and base material length: 50 mm) was prepared. A palladium nitrate solution, $La_2O_3$-modified $Al_2O_3$ powder, CZ composite oxide powder supplemented with minute amounts of $Pr_2O_3$, $Nd_2O_3$, $La_2O_3$, and $Y_2O_3$, barium sulfate having an average particle size of 100 nm, a $Al_2O_3$-based binder, and ion-exchanged water were mixed, thereby preparing Pd-containing slurry. The Pd-containing slurry was poured into the base material, and an unnecessary portion of the slurry was blown out by a blower, thereby coating a wall surface of the base material with the slurry. Next, the base material was placed in a drier at 120° C. and dried for two hours. Thereafter, the base material was fired at 500° C. for two hours in an electric heating furnace, thereby forming a Pd catalyst layer as a first catalyst layer.

A rhodium nitrate solution, $La_2O_3$-modified $Al_2O_3$ powder, CZ composite oxide powder supplemented with minute amounts of $Pr_2O_3$, $Nd_2O_3$, $La_2O_3$, and $Y_2O_3$, an $Al_2O_3$-based binder, and ion-exchanged water were mixed, thereby preparing Rh-containing slurry. This Rh-containing slurry was poured onto the base material on which the Pd catalyst layer had been formed, and an unnecessary portion of the slurry was blown out by a blower, thereby coating a wall surface of the base material on which the Pd catalyst layer had been formed with the slurry. Next, the base material was placed in a drier at 120° C. and dried for two hours. Thereafter, the base material was fired at 500° C. for two hours in an electric heating furnace, thereby forming a Rh catalyst layer, as a second catalyst layer, on the Pd catalyst layer.

In the manner described above, an exhaust gas purification catalyst according to Example 1 in which the Pd catalyst layer and the Rh catalyst layer were sequentially stacked on the base material was obtained. In the exhaust gas purification catalyst, a supported amount of Pd was 2 g/L, and a supported amount of Rh was 0.15 g/L.

Other Examples and Comparative Examples

Exhaust gas purification catalysts were produced in a manner similar to Example 1 except for using compounds having average particle sizes shown in the table below as barium components. It should be noted that an average particle size of barium sulfate having an average particle size of 50 nm or more was adjusted by wet grinding. For barium sulfate having an average particle size of 5 nm, water-soluble Ba was used for preparing slurry.

Reference Examples

As a base material, a honeycomb base material of cordierite (volume: 551 mL, the number of cells: 600 cpsi, partition thickness: 4 mil, cell shape: quadrangle, and base material length: 50 mm) was prepared. Exhaust gas purification catalysts were produced in a manner similar to Example 1 except for using this cordierite base material and using compounds having average particle sizes shown in the table below as a barium component.

TABLE 1

|  | Barium Component | Average Particle Diameter (nm) |
| --- | --- | --- |
| Comparative Example 1 | barium acetate | 5 |
| Comparative Example 2 | barium sulfate | 50 |
| Example 1 | barium sulfate | 100 |
| Example 2 | barium sulfate | 150 |
| Example 3 | barium sulfate | 200 |
| Example 4 | barium sulfate | 350 |
| Comparative Example 3 | barium sulfate | 400 |
| Comparative Example 4 | barium sulfate | 500 |
| Reference Example 1 | barium acetate | 5 |
| Reference Example 2 | barium sulfate | 50 |
| Reference Example 3 | barium sulfate | 100 |
| Reference Example 4 | barium sulfate | 200 |
| Reference Example 5 | barium sulfate | 350 |
| Reference Example 6 | barium sulfate | 400 |
| Reference Example 7 | barium sulfate | 500 |

It should be noted that the average particle size of barium acetate used was evaluated with a TEM, and the average particle size of barium sulfate used was evaluated with FE-SEM and laser diffraction particle size distribution analyzer. In addition, a portion of a catalyst layer of the exhaust gas purification catalyst produced above was taken as a sample, and an SEM image of the sample was acquired with a FE-SEM, and an average particle size was determined as an average value of particle sizes of 20 particles in the SEM image. Then, it was confirmed that the determined average particle size was equal to the average particle size of barium acetate used and barium sulfate used.

<High-Temperature Durability Test>

An exhaust system of a V-type 8-cylinder gasoline engine placed on a base was equipped with exhaust gas purification catalysts of the examples, the comparative examples, and the reference examples and subjected to a durability test for 50 hours at a catalyst bed temperature of 1000° C. under a condition including a predetermined fuel cut, <Evaluation of Oxygen Storage Capacity (OSC)>

Figure 4:
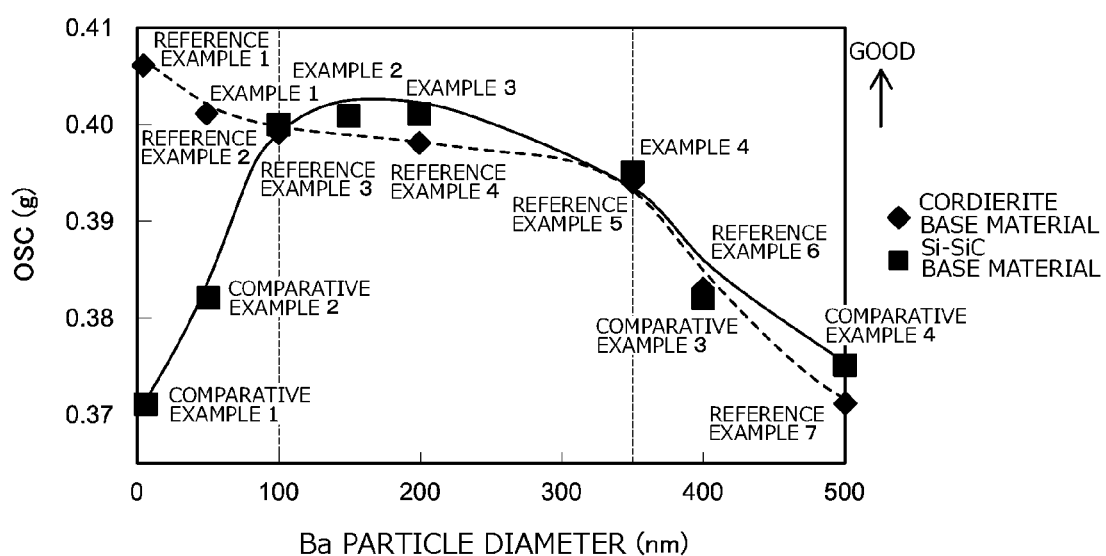
FIG. 4 A graph showing evaluation results of oxygen absorption capacity of exhaust gas purification catalysts according to examples, comparative examples, and reference examples.

An exhaust system of a gasoline engine placed on a base was equipped with the exhaust gas purification catalysts of the examples, the comparative examples, and the reference examples which had been subjected to the durability test described above. An $O_2$ sensor was disposed downstream of the catalysts. An air-fuel ratio A/F of a gas mixture to be supplied to the engine was switched repeatedly between rich and lean in a square-wave manner. A sum of an oxygen release amount and an oxygen absorption amount at this time was integrated, and an OSC was calculated. FIG. 4 shows results.

<Evaluation of NOx Purification Performance>

Figure 5:
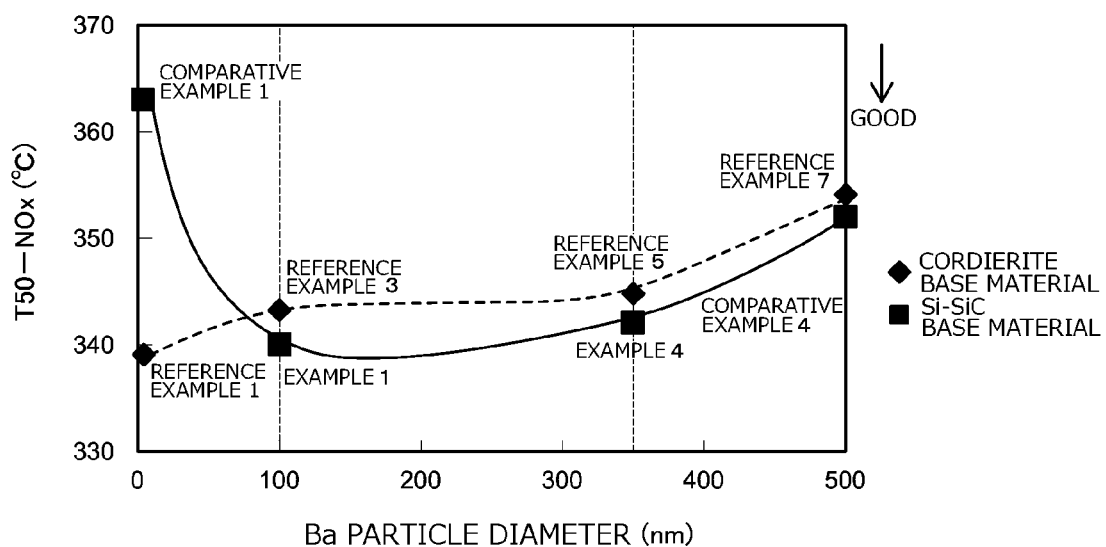
FIG. 5 A graph showing evaluation results of NOx purification performance of exhaust gas purification catalysts according to examples, comparative examples, and reference examples.

The exhaust gas purification catalysts of the examples, the comparative examples, and the reference examples were disposed in an exhaust system of an engine bench, and a combustion state of the engine was controlled based on a stoichiometric air-fuel ratio. The temperature of an inflow gas into each catalyst was increased from 200° C. to 500° C. at a temperature rise speed of 10° C./min. by using a heat exchanger. An intake air amount of the engine was 25 g/sec. Gas components of an inflow gas into the catalyst and an outflow gas from the catalyst during the temperature rise were analyzed, and a temperature at which 50% of a NOx component could be purified (50% purification temperature of NOx component: T50-NOx) was calculated. FIG. 5 shows results.

As shown in the results of FIG. 4, in the case of using the cordierite base material (e.g., base material different from a Si—SiC base material), as the average particle size of the barium component decreased, high-temperature durability of oxygen storage capacity increased. This is because as the average particle size of the barium component decreases, the barium component is more highly dispersed, and the effect of suppressing poisoning of the platinum-group catalyst by HC is enhanced.

On the other hand, it can be found that in the case of using the Si—SiC base material, a behavior of high-temperature durability of oxygen storage capacity is different. Specifically, the durability of oxygen storage capacity was high in the range where the average particle size of the barium component is 100 nm or more and 350 nm or less. This is because in the case of using the Si—SiC base material, by significantly increasing the average particle size of the barium component, contact between Ba included in the catalyst layer and Si included in the base material can be reduced, whereas by setting the average particle size within an appropriate range, the Ba element can be present in a dispersed state in the catalyst layer together with the platinum-group catalyst.

From the results of FIG. 5, in the case of using the cordierite base material, as the average particle size of the barium component decreased, NOx purification performance increased.

On the other hand, in the case of using the Si—SiC base material, purification performance of NOx was high in the range in which the average particle size of the barium component was 100 nm or more and 350 nm or less. In particular, if the average particle size was less than 100 nm, degradation of NOx purification performance due to deterioration of the OSC material was remarkable. This is because when the average particle size of the barium component is excessively small, the Si—SiC base material is damaged, and an electrification property and a uniform heating property of the base material degrade.

In the manner described above, the exhaust gas purification catalyst disclosed here has excellent high-temperature durability of oxygen storage capacity although the Si—SiC composite material is used in the base material and the barium component is used in the catalyst layer.

Specific examples of the present invention have been described in detail hereinbefore, but are merely illustrative examples, and are not intended to limit the scope of claims. The techniques described in claims include various modifications and changes of the above exemplified specific examples.

What is claimed is:

1. An exhaust gas purification catalyst comprising:
    a base material; and
    a catalyst layer in contact with the base material, wherein
    the base material contains a silicon-silicon carbide composite material,
    the catalyst layer includes a platinum-group metal catalyst, a barium component, and an oxygen storage material,
    the barium component is at least one material selected from the group consisting of barium and a barium compound,
    the barium component is present at least on a surface of the oxygen storage material, and
    the barium component has an average particle size of 100 nm or more and 350 nm or less.

2. The exhaust gas purification catalyst according to claim 1, wherein the average particle size of the barium component is 100 nm or more and 200 nm or less.

3. The exhaust gas purification catalyst according to claim 2, wherein the platinum-group metal catalyst is Pd.

4. The exhaust gas purification catalyst according to claim 2, further comprising:
    an electrode, wherein
    the exhaust gas purification catalyst is an electrically heated catalyst.

5. The exhaust gas purification catalyst according to claim 1, wherein the platinum-group metal catalyst is Pd.

6. The exhaust gas purification catalyst according to claim 5, further comprising:
    an electrode, wherein
    the exhaust gas purification catalyst is an electrically heated catalyst.

7. The exhaust gas purification catalyst according to claim 1, further comprising:
    an electrode, wherein
    the exhaust gas purification catalyst is an electrically heated catalyst.

* * * * *